June 5, 1956  F. B. ADAM  2,749,385
BUSDUCT
Filed Jan. 5, 1951
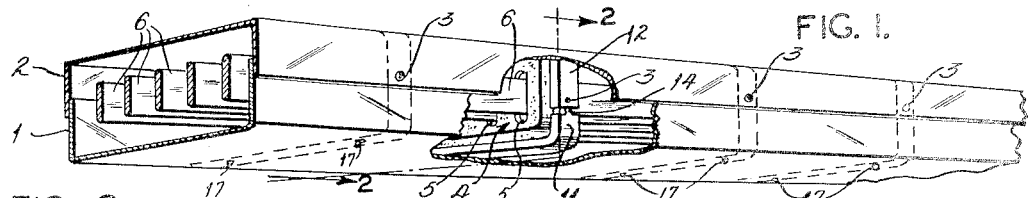
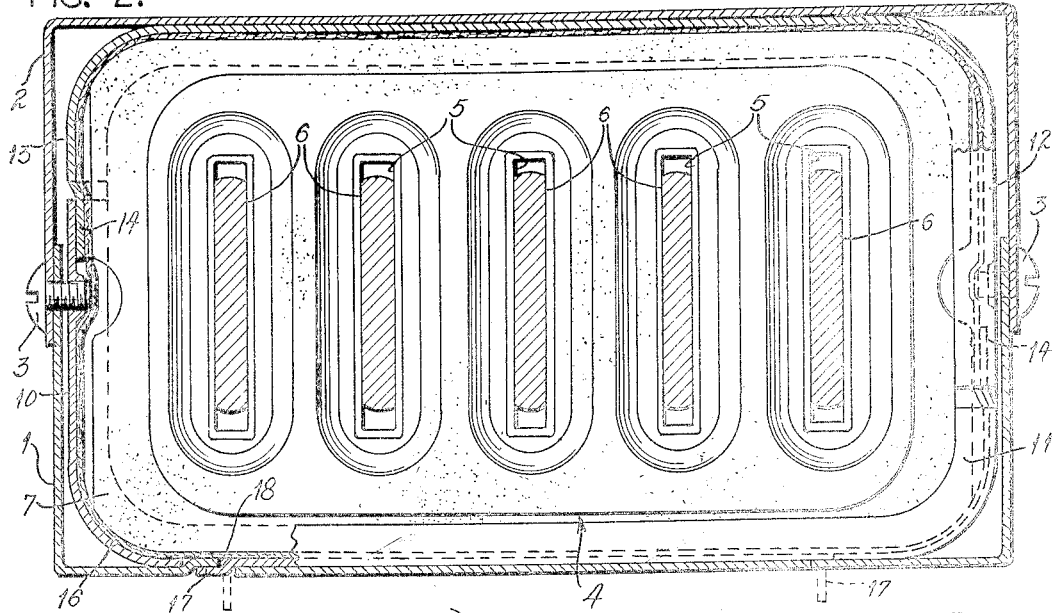
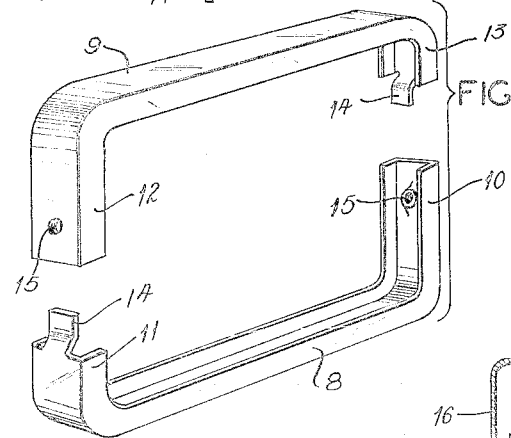
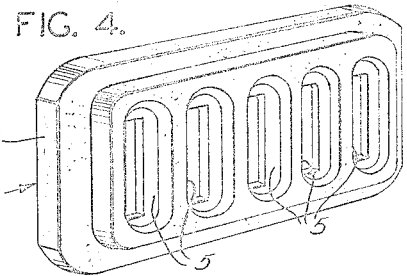
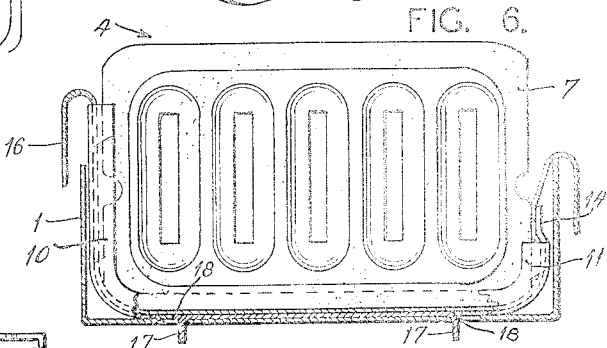
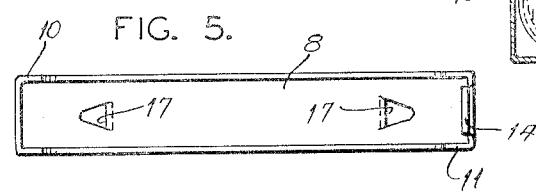
INVENTOR:
FREDERICK B. ADAM
BY
ATTORNEYS.

United States Patent Office 2,749,385
Patented June 5, 1956

2,749,385
BUSDUCT

Frederick B. Adam, Huntleigh Village, Mo., assignor to Frank Adam Electric Company, St. Louis, Mo., a corporation of Missouri Application January 5, 1951, Serial No. 204,556

2 Claims. (Cl. 174—99)

This invention relates generally to busduct, and particularly to the manner of supporting bus bars within a duct in insulated relation from each other and securely connected to the enclosure.

In the manufacture of busduct, it is customary to provide an enclosure consisting of two pieces, one of which may be in the form of a trough constituting three sides of the enclosure, and the other in the form of a lid. Alternatively, the enclosure may be formed of two troughs, each of which constitutes the whole of one side and part only of two other sides. The latter type of construction offers some advantages from the standpoint of ease of assembling the bus bars with the insulators therein, but heretofore the methods employed for connecting the insulators to ducts of this type have involved the utilization of a multiplicity of bolts or through-bolts, and consequently required an excessive amount of manual labor in the assembly, as well, when through-bolts are used, as requiring additional space within the enclosure.

The object of the present invention, generally stated, is to facilitate the manufacture, and improve the economy in manufacturing, busduct of the character aforesaid.

Other objects will become apparent to those skilled in the art when the following description is read in connection with the accompanying drawings, in which:

Figure 1 is a perspective view of a section of busduct constructed in accordance with the present invention, part being broken away to reveal the relationship of the parts;

Figure 2 is a sectional view taken along line 2—2 of Figure 1;

Figure 3 is a perspective view showing a pair of insulator-supporting brackets as employed in accordance with the present invention;

Figure 4 is a perspective view of an insulator block as employed in the embodiment shown in Figure 1;

Figure 5 is a plan view of one of the insulator supports shown in Figure 3; and

Figure 6 is an end view of a partially assembled section of busduct constructed in accordance with the present invention.

Generally stated, the present invention contemplates that the insulation block which supports the bus bars in a section of busduct be positioned therein by a two-part clamping ring, which embraces the insulation, and that the parts of the clamping ring be held in position within the enclosure by the same screws or other connectors which hold the parts of the enclosure together.

Referring now to the drawings for an illustrative embodiment of the invention, the enclosure for the busduct consists of two channel sections 1 and 2, each of which constitutes one complete side, and part only of two other sides, of the enclosure. The channels 1 and 2 are arranged open-side-to-open-side with the free margins of the flanges of channel 1 on the inside of and connected to the free margins of the flanges of channel 2 by spaced screws 3.

Within the enclosure a plurality of insulation blocks 4 is provided. The blocks may be formed of porcelain or other suitable insulation material and are provided with a plurality of apertures 5 to receive the several bus bars 6. In the embodiment shown, a single insulation block is provided for five bus bars, but it will be understood that the insulation block may, if desired, be divided into sections, each accommodating one or more bus bars. About its periphery, the insulation block is formed with a rib 7.

Each of the insulation blocks 4 is embraced by a two-part clamping ring, shown clearly in Figure 3. The respective parts 8 and 9 of the clamping ring may be identical and each is formed of channel section having an internal dimension such as to accommodate the rib 7 about the insulation block 4. The clamping ring part 8 has a central section proportioned to extend for the full length of one long edge of the insulation block 4. At one end of the central section, an end section 10 is provided, and at the other end of the central section, an end section 11 is provided, the latter being shorter than the former. Likewise, the clamping member 9 has a long end 12 and a short end 13, the orientation of which is opposite that of the member 8. The short ends 11 and 13 of the clamping members are provided with a tongue 14 having a width such as to be received between the flanges of the long end of the opposite member. The long ends 10 and 12 are provided with apertures 15 to accommodate screws 3. If desired, the apertures 15 may be internally threaded, but otherwise it is desirable to weld or otherwise affix a nut on the interior thereof. When the clamping parts 8 and 9 are brought together about the insulation block 4, the tongues 14 preferably terminate just short of the apertures 15, as clearly shown in Figure 2, but said tongues lie within the channel of the long end of the opposite clamping member.

To provide a cushion against mechanical shock, the interior of the channels in members 8 and 9 may be lined with a strip 16 of rubber, felt, or the like. Such shock-absorbing lining is particularly desirable when the insulator 4 is made of porcelain or other fragile material.

If desired, one or both of the clamping members 8 and 9 may be punched out to provide anchoring tongues 17 for interengagement with corresponding apertures 18 in the enclosure. Preferably only the bottom one of the clamping members is thus provided for anchorage with the enclosure.

In the process of assembling the component parts of busduct in accordance with the present invention, the enclosed section 1 is supported with its open side up, and a series of channel members 8 arranged therein, each with its aperture 15 in alignment with the aperture in the section 1, which is to accommodate a screw 3. The tongue 17 of the member 8, when so disposed, extends through preformed apertures 18 in the section 1. With the parts thus disposed, the strip 16 of cushion material is applied within the channel of member 8, and the rib 7 of an insulation block 4 interfitted with each of the members 8. If desired, the several bus bars 6 may have been threaded through the openings 5 in the several insulation blocks 4, and all seated in their sections 8 concurrently. Otherwise, the bus bars are threaded through the insulators after the latter are emplaced within the members 8. After the insulation blocks 4 and the bus bars are in place, the strip 16 is drawn about the top of the insulation block, and the opposite channel member 9 emplaced with its tongue 14 projecting into the channel of member 8 adjacent the aperture 15 therein. Thereupon, the top section 2 of the enclosure is placed upon the previously assembled parts with the holes therein, which receive the screws 3, aligned with corresponding holes in the section 1 and the aperture 15 of the member 9. Screws 3 are then applied through the holes in both sections 1 and 2 and through apertures 15 in the members 8 and 9.

With such an arrangement, the separate halves of the enclosure are not only anchored together, but the insulators are secured in proper position within the enclosure through the same screws, and all without any possibility that the insulator may be subjected to such strains in the process of assembly that it may be crushed or fractured.

From the foregoing description those skilled in the art should readily understand that the invention accomplishes its objects and provides a convenient and economical construction which may be assembled with a minimum of tedium. While one complete embodiment of the invention has been disclosed in detail, it is to be understood that such disclosure is by way of illustration and not limitation. It is apparent that many modifications and variations will present themselves to those skilled in the art without departing from the spirit of the invention, and the same are, therefore, contemplated by and within the scope of the appended claims.

Having thus described the invention, what is claimed and desired to be secured by Letters Patent is:

1. In busduct of the type wherein bus bars are embraced and thereby supported at spaced points along their length by insulators; the improvement which comprises said insulators being of generally rectangular outline, a pair of opposed channel members forming a closed loop which collectively encircles and marginally envelopes each of said insulators, a pair of telescoping duct sections with marginally overlapped side portions forming a confining enclosure for said loop, each of said channel members terminating at the sides of said enclosure and having a tongue at one end and a fastener connection at the other end, and screw fasteners extending through said overlapped side portions of said duct into engagement with the fastener connections of said channel members, said tongues being received within the channels of said channel members.

2. Apparatus as set forth in claim 1, wherein said screw fasteners are located at the sides of the duct intermediate the top and bottom edges, each of said channel members having a relatively long leg extending along one side and a relatively short leg extending along the other side, said fastener connection being in said relatively long leg and said tongue projecting from the relatively short leg.

References Cited in the file of this patent

UNITED STATES PATENTS

| | | |
|---|---|---|
| 1,983,614 | Kenny | Dec. 11, 1934 |
| 2,059,988 | Frank | Nov. 3, 1936 |
| 2,318,859 | Huguelet | May 11, 1943 |
| 2,341,841 | Carlson | Feb. 15, 1944 |
| 2,439,956 | Wagner | Apr. 20, 1948 |
| 2,445,424 | Fountain | July 20, 1948 |